Aug. 12, 1969     D. M. PATTON     3,461,270
TUBULAR WELDING ELECTRODE
Filed Jan. 6, 1966
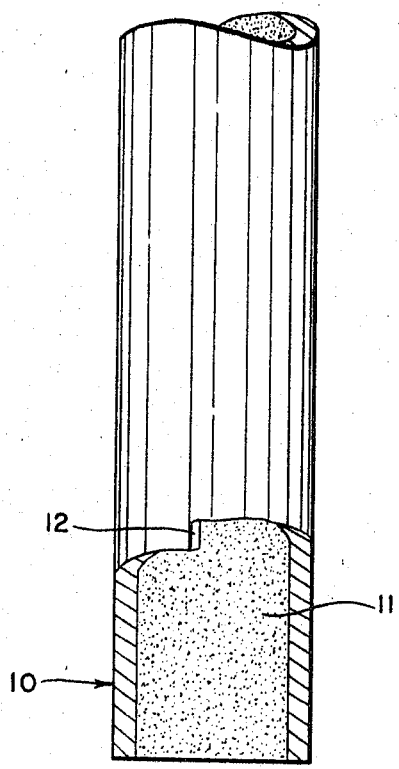
INVENTOR.
DONALD M. PATTON
BY
*Meyer, Tilberry & Body*
ATTORNEYS

United States Patent Office 3,461,270
Patented Aug. 12, 1969

3,461,270
TUBULAR WELDING ELECTRODE
Donald M. Patton, Cleveland Heights, Ohio, assignor to The Lincoln Electric Company, Cleveland, Ohio, a corporation of Ohio
Filed Jan. 6, 1966, Ser. No. 519,059
Int. Cl. B23k 35/22, 35/04
U.S. Cl. 219—146                 12 Claims

ABSTRACT OF THE DISCLOSURE

A tubular welding electrode particularly intended for out-of-position welding, wherein the ingredients in the inside of the tube contain, in addition to the usual slagging agents, metal additives and/or metal fill, a hydrocarbon and, in some cases, a carbohydrate.

---

This invention pertains to the art of tubular welding electrodes for use in electric arc welding and more particularly to improvements in the fluxing materials therefor.

The invention is particularly applicable to a tubular steel electrode wherein all or substantially all of the fluxing materials are contained on the inside of the tube and wherein the electrode is to be used at relatively lower welding currents, for example, in out-of-position welding, and will be described with particular reference thereto although it will be appreciated that the invention has broader applications and may in some instances be used with the higher welding currents.

The fluxing ingredients contained on the inside of a tubular steel electrode are of several different types and perform a number of different functions, e.g. metal additives which go into the weld pool and make the metallurgy of the weld bead different from that of either the base metal or of the steel tube; metal fill of iron which increases the bulk of the ingredients and enables them to be tightly packed in the tube; slagging agents which form a molten film over the hardening weld bead to both protect and shape the same; and, atmosphere excluding agents which create an expanding cloud of gas to at least partly exclude the atmosphere from the vicinity of the arc and the weld pool.

One such electrode is described and claimed in United States Patent No. 2,909,778, issued Oct. 20, 1959, and assigned to the assignee of this application. Such patent describes a tubular steel electrode wherein the atmosphere excluding agents are generally the fluorides which vaporize in the heat of the arc to exclude the atmosphere. Such electrode performs well in downhand welding wherein relatively large welding currents can be used and what may be termed a globular metal transfer is employed. Here there is an appreciable arc and substantial amounts of heat are generated in the arc.

However, in out-of-position welding, the metal has always been transferred from the end of the electrode to the molten weld pool in the form of drops and the currents employed are substantially less. The drop periodically shorts the electrode end to the well pool and an arc exists only part of the time. Thus substantially less heat is developed. At these lower currents, there is generally insufficient heat generaetd to both melt off the metal tube and vaporize the air excluding agent as well as melt the metal additives and metal fill. As a result, the exclusion of the atmosphere has been insufficient. Thus, in out-of-position welding or where lower currents are employed, satisfactory welds have been difficult to obtain with tubular welding electrodes.

The problem is further complicated by the fact that in the manufacture of a tubular electrode there is a minimum size hole diameter which can be obtained using a given wall thickness tube. The amount of atmosphere excluding and slagging ingredients necessary to give a satisfactory weld is relatively small and has been insufficient to fill up this hole so that it is tightly packed therein. Thus it has been conventional to use a metal fill of iron to increase the bulk of the flux ingredients so that they can be tightly packed on the inside of the tube. This fill is heavy and requires substantial amounts of heat to melt it and further increases the problem of welding at low currents.

Still another problem of welding with tubular electrodes has been that the arc is between the weld pool and the metal of the tube which melts away somewhat faster than the tightly packed flux ingredients. Heretofore this has tended to leave a small amount of the flux ingredients projecting beyond the unmelted end of the metal something like the ash on a cigarette. In some instances, the physical length of this projection becomes longer than the electrical arc itself and the slag itself contacts the weld pool, or in some instances the bottom of the weld pool, which is undesirable. Also the projection periodically breaks off and sometimes results in a slag inclusion in the weld bead.

The present invention contemplates a tubular steel electrode having a formulation of fluxing ingredients on the inside thereof which overcomes all of the above problems and others, assists the packed flux ingredients in breaking away from the end of the electrode, is of sufficiently low percentage of the total electrode weight as to be readily melted off by the lower welding currents and which provides an improved degree of atmosphere exclusion from the vicinity of the welding arc.

In accordance with the invention, a welding electrode is provided comprised of an elongated steel tubular member having on the inside thereof as an essential and novel ingredient, a hydrocarbon which: (1) is a liquid at 100° C., (2) when further heated will vaporize or fractionate into other volatile hydrocarbons having a smaller molecular weight, (3) does not contain elements detrimental to steel such as nitrogen, sulphur or phosphorus.

Hydrocarbons falling within the classification of elements 1 and 2 are the saturated fatty acids, the unsaturated fatty acids, the glycerides, the polyglycols, and other waxy materials. Carbohydrates are excluded from this definition although, as will appear, they may be employed as a fluxing ingredient for other purposes.

The hydrocarbon at room temperature may be present in the fluxing ingredients as a liquid but preferably is a solid.

The amount of hydrocarbon employed in accordance with the invention is that sufficient to perform the desired function, e.g., 0.10% of the total electrode weight up to an excessive amount, e.g., 10%. From 0.30% to 1.0% is preferred.

The interior of the tube also preferably contains metal additives, metal fill and slagging agents.

The slagging agents are mixtures of: the oxides of aluminum, calcium, iron, manganese, magnesium, silicon, titanium or zirconium; the silicates of aluminum, potassium, sodium, zirconium and the complex silicates thereof as found in certain clays; and the halides and complex halides of the alkali metals, the alkaline earth metals, silicon and aluminum. The mixture is in such proportions to give a freezing temperature less than the freezing temperature of molten steel.

The slagging agents are present in amounts of from 3.0% to 7.0% of the total weight of the electrode. 4.0% to 5.0% is preferred.

The metal additives are aluminum, carbon, manganese, silicon, titanium and zirconium either as elements, ferro alloys, or alloys of each other. One or more of the metal additives are present in total amounts of from 1.0% to 2.5% of the total electrode weight. 1.5% to 2.0% is preferred.

The metal fill is iron in powder form. Some of the iron may be alloyed with or combined with one or more of the metal additives. Thus, the carbon of the metal additives may be included as the carbon of powdered cast iron.

The metal fill is present in amounts of from 4.0% to 12.0% of the total electrode weight. 7% to 9% is preferred.

In accordance with a somewhat limited but preferred aspect of the invention, the fluxing ingredients also include in addition to the hydrocarbon as above defined and as an essential and novel ingredient, a carbohydrate in amounts of from 0.5% to 5.0% of the total electrode weight. 1.0% to 2.0% is preferred.

The carbohydrate has a prime function of providing bulk to the fluxing ingredient such that less of the metal fill, metal additives and slagging ingredients are required to completely and tightly fill the interior of the tubular electrode member such that less heat is required to melt these ingredients. The carbohydrate performs a second function of decomposing and burning in the heat of the arc to produce water vapor and carbon dioxide, both of which are a gas and help to exclude the nitrogen of the atmosphere from the vicinity of the arc. The carbohydrate is preferably in the form of cellulose and is thus light and fluffy.

In operation, the hydrocarbon appears to melt and coat the particles of the other flux ingredients including the carbohydrate. This molten hydrocarbon serves as a heat conductor from the outer surface of the fluxing ingredients adjacent the inner walls of the tube radially inwardly. This inwardly conducted heat makes the hydrocarbon boil and/or fractionate into a hydrocarbon gas and also decomposes the cellulose into water vapor and carbon. This conduction of heat inwardly and the evolving of gas on the inside of the tightly packed fluxing ingredients tends to break up the tightly packed flux ingredients preventing the formation of a projection of fluxing ingredients beyond the arcing end of the metal tube.

Some of the hydrocarbon, coated on the flux particles, is carried into the weld pool where it continues to boil producing a hydrocarbon in vaporous form.

Observing the arcing end of the electrode through a dark lens indicates that the hydrocarbon exudes through the seam of the tubular electrode, exudes from the lower end of the electrode, changes to a gas and then combines with the oxygen of the atmosphere to form water vapor, carbon monoxide, and carbon dioxide. In addition, as above pointed out, the cellulose decomposes into water vapor and the carbon combines with the oxygen of the atmosphere to produce carbon monoxide and carbon dioxide, all of which are gases and act to exclude the atmosphere and particularly the nitrogen from the vicinity of the weld pool.

There are obviously many hundreds of hydrocarbons available which will probably work, but inasmuch as cost is always a factor in welding electrodes, it is preferred to use hydrocarbons which are readily obtainable and which have the lowest cost. Of the various hydrocarbons known, carnauba wax and polyalkylene-glycol or "carbowax" are preferred.

The principal object of the invention is the provision of a new and improved tubular welding electrode having improved air excluding characteristics.

Another object of the invention is the provision of a new and improved tubular electrode which gives improved weld beads.

Still another object of the invention is the provision of a new and improved formulation for the fluxing ingredients of a tubular electrode which enables the obtaining of improved welds, particularly in out-of-position or pipe welding.

Another object of the invention is the provision of new and improved fluxing ingredients for tubular electrodes, one of which ingredients is a hydrocarbon.

Another object of the invention is the provision of a new and improved formulation for the fluxing ingredients of a tubular electrode which prevents the formulation of a projection of the fluxing ingredients on the end of the tube greater than the length of the electric arc.

Another object of the invention is the provision of a new and improved tubular electrode wherein a very short welding arc may be employed.

Another object is a fluxing ingredient fill for a tubular steel electrode which enables the weight of the fill to be less than 15% of the total weight of the electrode.

Another object of the invention is the provision of a new and improved tubular electrode which gives excellent welds using relatively low welding current.

The invention may take physical form in certain flux formulations associated with a tubular steel electrode member as shown in the accompanying drawing wherein the sole figure shows a fragmentary portion of a length of a welding electrode with portions broken away to show the construction thereof.

Referring now to the drawing wherein the showing is for the purpose of illustrating a preferred embodiment of the invention only and not for the purpose of limiting same, the figure shows an electrode member 10 in the form of a hollow tube having on the inside thereof in tightly compacted form fluxing ingredients 11 compounded in accordance with the present invention.

The metal of the tube 10 may be as desired, but is preferably a low carbon steel which may have the usual trace or residual amounts of alloying agents such as silicon, manganese and the like. If the metal of the tube contains substantial amounts of silicon, manganese or the like, then the formulation of the fluxing ingredients should be appropriately adjusted.

The tube may be formed in any desired manner, but preferably is formed by providing: a ribbon having a U cross-sectional shape; filling the U with the fluxing ingredients and then bringing the upper ends of the legs of the U into tight fitting abutting relationship to form a seam 12. Obviously the ends of the U could be overlapped if desired. Also after bringing the ends of the legs of the U into tight fitting abutting relationship, the entire electrode may be drawn to size which results in a further compacting of the fluxing ingredients 11.

The outer diameter of the electrode is preferably 0.078 inch and the wall thickness is approximately 0.020 inch. This leaves a center opening having a diameter of approximately 0.038 inch which internal diameter is approximately the minimum diameter which can be successfully obtained in high production with the stated wall thickness.

It is to be noted that if this diameter were filled 100% with iron powder, the minimum weight of fill which can be made to fill the opening would be approximately 21% of the total weight of the electrode. If only slagging agents in workable proportions were employed, then the minimum weight of fill is approximately 18% of the total weight of the electrode. Using the present invention, particularly with the high bulk factor of the carbohydrates, the weight of the fluxing ingredients can be reduced to less than 15% of the total weight of the electrode.

It will be appreciated that the heat required to melt the fill must be conducted from the hot metal of the electrode member 10 or from the hot gases surrounding any projection of the fluxing ingredient 11 beyond the end of the electrode metal during the welding operation. Using the present invention, it will be noted that there is a substantial reduction in the weight of the fluxing ingredients which must be melted and thus less heat is required to melt off the electrode and a lesser current can be employed while still having a manageable weld pool. This is particularly important where shorting of the electrode end to the weld pool periodically occurs such as when a drop of metal transfers from the end of the metal tube to the weld pool. During this instant, no arc is present and a lesser amount of heat is generated.

While flux ingredients of from 13% to the total weight of the electrode are preferred, the invention contemplates a fill of from 10% to 15%.

The various classes of fluxing ingredients may be present in accordance with the invention in the following ranges:

|  | Maximum range | | Preferred range | |
| --- | --- | --- | --- | --- |
|  | Minimum | Maximum | Minimum | Maximum |
| Metal additive | 1.0 | 2.5 | 1.5 | 2.0 |
| Metal fill | 4.0 | 12.0 | 7.0 | 9.0 |
| Slagging agent | 3.0 | 7.0 | 4.0 | 5.0 |
| Hydrocarbon | 0.10 | 10.0 | 0.30 | 1.0 |
| Carbohydrate | 0.5 | 5.0 | 1.0 | 2.0 |

A specific formulation is as follows:

|  | A | B |
| --- | --- | --- |
| Metal additive: | | |
| Ferro titanium (40% Ti) | .60 | 4.62 |
| Silico manganese (20% Si 68% Mn 1.5% C Bal. Fe) | .20 | 1.54 |
| Ferro manganese (80% Mn 5-6% C Bal. Fe) | .30 | 2.31 |
| Zirconium silicon (40% Zr 50% Si) | .20 | 1.54 |
| Carbon (see metal fill) | | |
| Metal fill: | | |
| Iron powder | 3.95 | 30.65 |
| Cast iron powder (4% C Bal. Fe) | 2.20 | 17.10 |
| Slagging agents: | | |
| Iron oxide ($Fe_3O_4$) | 1.20 | 8.50 |
| Manganese ore (Mn O) | .30 | 2.31 |
| Rutile ($TiO_2$) | .60 | 4.62 |
| Limestone ($CaCO_3$) | .15 | 1.15 |
| Zirconium oxide ($ZrO_2$) | .40 | 3.08 |
| Sodium silicate ($NaO\ SIO_2$) | .10 | 0.077 |
| Mica (50% $SiO_2$ 9% $K_2O$ 4% $H_2O$) | .15 | 1.15 |
| Calcium fluoride ($CaF_2$) | .725 | 5.63 |
| Potassium silico fluoride ($K_2SiF_6$) | .10 | 0.077 |
| Hydrocarbon: | | |
| Carnauba wax | .20 | 1.54 |
| Polyethylene glycol (Carbowax 20M) | .25 | 1.93 |
| Carbohydrate: | | |
| Alphacellulose | .50 | 3.85 |
| Cellulose | .90 | 6.94 |
| Electrode | 86.975 |  |
|  | 100.00 | 100.00 |

A—Percent of total electrode weight; B—Percent of flux mix.

These ingredients are all finely ground, thoroughly mixed, placed in a U-shaped ribbon and the ends of the legs of the U brought into abutting engagement. The resulting filled tube is then passed through a sizing die which reduces the diameter of the inner opening and tightly packs the flux ingredients. Welding currents of 150–225 amperes are preferred.

This flux formulation has been found particularly of benefit in out-of-position welding and particularly in the welding of pipe in the field. It produces weld beads having improved characteristics and the necessary ductility and strength required for such demanding uses.

It will be noted that the carbowax and carnauba wax have melting temperatures of 55–60° C. and 83–87° C. respectively.

In the claims, all weights are given as percents of the total electrode weight.

The invention has been described with reference to a preferred embodiment. Obviously, modifications and alterations will occur to others upon a reading and understanding of this specification and it is my intention to include all such modifications insofar as they come within the scope of the appended claims.

Having thus described my invention, I claim:

1. An arc welding electrode comprised of elongated tubular steel member having on the inside thereof, in addition to the usual fluxing ingredients, a hydrocarbon fluxing ingredient in an amount within the range of 0.10% to 10%, having the following characteristics: when heated to a temperature above 100° C., vaporizes into a gas and/or fractionates into other volatile hydrocarbons, and does not contain nitrogen, sulphur or phosphorus.

2. The electrode of claim 1 wherein the improvement includes a carbohydrate.

3. The electrode of claim 1 wherein the hydrocarbon is present in amounts of from 0.30% to 1.0%.

4. The electrode of claim 1 wherein the improvement includes a carbohydrate in amounts of from 0.5% to 5.0%.

5. The electrode of claim 3 wherein the improvement includes a carbohydrate in amounts of from 1.0% to 2.0%.

6. A welding electrode comprised of a tubular steel member having on the inside thereof:
 (A) metal additives selected from the class consisting of aluminum, carbon, manganese, silicon, titanium and zirconium either as elements, ferro alloys or alloys of each other in amounts of 1.0% to 2.50%;
 (B) a metal fill consisting of iron in powder form in total amounts of from 4.0% to 12.0%;
 (C) slagging agents selected from the class consisting of oxides of aluminum, calcium, iron, magnesium, manganese, silicon, titanium and zirconium, the silicates of aluminum, potassium, sodium and zirconium and the complex silicates as found in certain clays and the halides or complex halides of the alkali metals, alkaline earth metals, silicon and aluminum, such slagging agents being present in such proportions to give a freezing temperature less than the freezing temperature of molten steel in amounts of from 3.0% to 7.0%; and,
 (D) a hydrocarbon in amounts of from 0.10% to 10% which is
  when further heated will vaporize into a gas and/or fractionate into other volatile hydrocarbons having a smaller molecular weight and,
  which do not contain nitrogen, sulphur or phosphorus.

7. The electrode of claim 6 wherein said ingredients also include a carbohydrate in amounts of from 0.5% to 5.0%.

8. The electrode of claim 6 wherein the hydrocarbon is present in amounts of from 0.30% to 1.0%.

9. The electrode of claim 8 wherein the ingredients include a carbohydrate in amounts of from 1.0% to 2.0%.

10. A welding electrode comprised of a tubular steel member having on the inside thereof: a metal additive selected from the class consisting of aluminum, carbon, manganese, silicon, titanium and zirconium either as elements, ferro alloys or alloys of each other in amounts of 1.5% to 2.5%; a metal fill consisting of iron in powder form in total amounts of from 7.0% to 9.0%; slagging agents selected from the class consisting of oxides of aluminum, calcium, iron, magnesium, manganese, silicon, titanium and zirconium, the silicates of aluminum, potassium, sodium and zirconium and the complex silicates as found in certain clays and the halides or complex halides of the alkaline metals, alkaline earth metals, silicon and aluminum, such slagging agents being in such proportions to give a freezing temperature less than the freezing temperature of molten steel in amounts of from 4.0% to 5.0% and a hydrocarbon in amounts of from 0.30% to 1.0% which is:
 when further heated will vaporize or fractionate into other volatile hydrocarbons having a smaller molecular weight and,
 which do not contain nitrogen, sulphur or phosphorus 11. The electrode of claim 10 wherein said ingredients also include a carbohydrate in amounts of from 1.0% to 2.0%.

12. An arc welding electrode comprised of a hollow steel tube formed by bringing the ends of the legs of a U-shaped ribbon into abutting engagement with the size of the opening of the tube being the minimum possible with the wall thickness of the tube, said tube having on the inside thereof a mixture of powdered metals and powdered nonmetallic slag forming ingredients together with a hydrocarbon and sufficient carbohydrate that the weight of the fill does not exceed 15% of the total weight of the electrode.

References Cited

UNITED STATES PATENTS

| | | | |
|---|---|---|---|
| 2,547,771 | 4/1951 | Pessel | 148—24 |
| 2,631,952 | 3/1953 | Williams | 148—24 X |
| 2,761,796 | 9/1956 | Wasserman | 219—146 X |
| 1,751,668 | 3/1930 | Taylor | 219—74 |
| 2,102,891 | 12/1937 | Faulkner | 219—146 |

JOSEPH V. TRUHE, Primary Examiner

B. A. STERN, Assistant Examiner

U.S. Cl. X.R.

29—191; 148—24